(12) United States Patent
Zhu et al.

(10) Patent No.: US 11,956,787 B2
(45) Date of Patent: Apr. 9, 2024

(54) POWER HEADROOM REPORTING IN COVERAGE EDGE

(71) Applicant: QUALCOMM Incorporated, San Diego, CA (US)

(72) Inventors: Xipeng Zhu, San Diego, CA (US); Linhai He, San Diego, CA (US); Mutaz Zuhier Afif Shukair, San Diego, CA (US); Xiaoxia Zhang, San Diego, CA (US); Gavin Bernard Horn, La Jolla, CA (US); Masato Kitazoe, Hachiouji (JP); Xiao Feng Wang, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/374,531

(22) Filed: Apr. 3, 2019

(65) Prior Publication Data
US 2019/0313441 A1  Oct. 10, 2019

Related U.S. Application Data

(60) Provisional application No. 62/653,151, filed on Apr. 5, 2018.

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0094* (2013.01); *H04W 52/365* (2013.01); *H04W 72/0446* (2013.01); *H04W 80/02* (2013.01)

(58) Field of Classification Search
USPC .......................................... 370/329
See application file for complete search history.

(56) References Cited

U.S. PATENT DOCUMENTS

| | | | |
|---|---|---|---|
| 10,085,265 B2 | 9/2018 | Vajapeyam et al. | |
| 2009/0303954 A1* | 12/2009 | Guo | H04L 47/30 370/329 |

(Continued)

FOREIGN PATENT DOCUMENTS

| | | |
|---|---|---|
| CN | 102428730 A | 4/2012 |
| CN | 104066113 A | 9/2014 |

(Continued)

OTHER PUBLICATIONS

Partial International Search Report—PCT/US2019/025804—ISA/EPO—dated Jun. 26, 2019.

(Continued)

*Primary Examiner* — Jeffrey M Rutkowski
*Assistant Examiner* — Luna Weissberger
(74) *Attorney, Agent, or Firm* — Patterson + Sheridan, L.L.P.

(57) ABSTRACT

Certain aspects of the present disclosure provide techniques for reporting an indication of a PHR when the UE's assigned of UL resources is insufficient to transmit both UL data and a PHR. Additionally, aspects described herein introduce a negative PHR used to indicate the UE requires additional UL resources.

30 Claims, 15 Drawing Sheets

(51) Int. Cl.
*H04W 52/36* (2009.01)
*H04W 72/0446* (2023.01)
*H04W 80/02* (2009.01)

(56) References Cited

U.S. PATENT DOCUMENTS

| | | | | |
|---|---|---|---|---|
| 2011/0250918 A1* | 10/2011 | Jen | ............... | H04W 52/08 455/509 |
| 2012/0281568 A1 | 11/2012 | Ho et al. | | |
| 2013/0128859 A1* | 5/2013 | Takaoka | ............... | H04L 5/001 370/329 |
| 2013/0215849 A1* | 8/2013 | Heo | ............... | H04W 52/365 370/329 |
| 2013/0225223 A1* | 8/2013 | Nukala | ............... | H04W 52/265 455/522 |
| 2015/0055576 A1* | 2/2015 | Zhang | ............... | H04L 5/0094 370/329 |
| 2015/0065188 A1* | 3/2015 | Nukala | ............... | H04W 52/241 455/575.7 |
| 2015/0172032 A1* | 6/2015 | Khay-Ibbat | ............... | H04L 5/001 370/329 |
| 2016/0150485 A1* | 5/2016 | Yi | ............... | H04W 52/34 370/311 |
| 2017/0273056 A1* | 9/2017 | Papasakellariou | .. | H04W 52/143 |
| 2018/0132266 A1* | 5/2018 | Chen | ............... | H04L 47/522 |
| 2018/0146467 A1* | 5/2018 | Kim | ............... | H04W 28/065 |
| 2019/0357235 A1* | 11/2019 | Wang | ............... | H04W 72/569 |
| 2020/0029262 A1* | 1/2020 | Kim | ............... | H04W 36/30 |

FOREIGN PATENT DOCUMENTS

| | | | |
|---|---|---|---|
| CN | 104365048 A | 2/2015 | |
| WO | 2010051514 A1 | 5/2010 | |
| WO | 2014175634 A1 | 10/2014 | |
| WO | WO-2015041409 A1 * | 3/2015 | ........... H04B 7/2615 |
| WO | 2015116757 | 8/2015 | |
| WO | 2015116866 A1 | 8/2015 | |
| WO | 2017024432 A1 | 2/2017 | |
| WO | WO-2017024432 A1 * | 2/2017 | |

OTHER PUBLICATIONS

Ericsson: "PHR Reporting for NB-IOT Low-Power Class UEs", 3GPP Draft; R4-1703126, 3rd Generation Partnership Project (3GPP), Mobile Competence Centre, 650, Route Des Lucioles, F-06921 Sophia, vol. RAN WG4, No. Spokane, US; Apr. 3, 2017-Apr. 7, 2017 Apr. 3, 2017, XP051246339, Retrieved from the Internet: URL:http://www.3gpp.org/ftp/Meetings_3GPP_SYNC/RAN4/Docs/ [retrieved on Apr. 3, 2017], 4 pages.
International Search Report and Written Opinion—PCT/US2019/025804—ISA/EPO—dated Nov. 7, 2019.
European Search Report—EP22155764—Search Authority—The Hague—dated Apr. 20, 2022.
Nokia Siemens Networks: "Power Headroom Reporting", 3GPP TSG-RAN WG2 Meeting #62, R2-082197, vol. No. 62, May 5, 2008 (May 5, 2008), pp. 1-4, XP002537452, Retrieved from the Internet: URL: ftp://ftp.3gpp.org/TSG_RAN/WG2_RL2/TSGR2_62/Docs/R2-082197.zip [Retrieved on Jul. 16, 2009], The Whole Document.

* cited by examiner

US 11,956,787 B2

POWER HEADROOM REPORTING IN COVERAGE EDGE

CLAIM OF PRIORITY UNDER 35 U.S.C. § 119

This application claims benefit of U.S. Provisional Patent Application Ser. No. 62/653,151, filed Apr. 5, 2018, which is herein incorporated by reference in its entirety.

FIELD OF THE DISCLOSURE

Aspects of the present disclosure relate to wireless communications, and more particularly, to techniques for reporting an indication of PHR when a UE has insufficient resources to transmit both UL transmissions and a PHR. Aspects also introduce a negative PHR value, used to indicate the UE needs additional UL resources.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a UE. The method generally includes receiving an uplink (UL) grant assigning resources for UL transmissions from the UE to a next generation Node B (gNB), determining the assigned resources are insufficient to transmit UL data and a power headroom report (PHR) for a cell associated with the UL grant; and based, at least in part, on the determination, taking one or more actions to transmit the UL data and convey an indication of the PHR to the gNB.

Certain aspects provide an apparatus for wireless communication by a UE. The apparatus generally includes at least one processor configured to receive an uplink (UL) grant assigning resources for UL transmissions from the UE to a next generation Node B (gNB), determine the assigned resources are insufficient to transmit UL data and a power headroom report (PHR) for a cell associated with the UL grant; and based, at least in part, on the determination, take one or more actions to transmit the UL data and convey an indication of the PHR to the gNB. The apparatus also generally includes a memory coupled with the at least one processor.

Certain aspects provide an apparatus for wireless communication by a UE. The apparatus generally includes means for receiving an uplink (UL) grant assigning resources for UL transmissions from the UE to a next generation Node B (gNB), means for determining the assigned resources are insufficient to transmit UL data and a power headroom report (PHR) for a cell associated with the UL grant; and based, at least in part, on the determination, means for taking one or more actions to transmit the UL data and convey an indication of the PHR to the gNB.

Certain aspects provide a non-transitory computer-readable medium for wireless communication by a UE. The non-transitory computer-readable medium generally includes instructions that, when executed by at least one processor, cause the at least one processor to receive an uplink (UL) grant assigning resources for UL transmissions from the UE to a next generation Node B (gNB), determine the assigned resources are insufficient to transmit UL data and a power headroom report (PHR) for a cell associated with the UL grant; and based, at least in part, on the determination, take one or more actions to transmit the UL data and convey an indication of the PHR to the gNB.

Certain aspects provide a method for wireless communication by a base station. The method generally includes transmitting an uplink (UL) grant assigning resources to user equipment (UE) for UL transmissions to the gNB, wherein the assigned resources are insufficient for the UE to transmit UL data and a power headroom report (PHR) for a cell associated with the UL grant, receiving, from the UE, the UL data and an indication of the PHR, and taking one or more actions based, at least in part, on the received indication.

Certain aspects provide a method for wireless communication by a base station. The apparatus generally includes at least one processor configured to transmit an uplink (UL) grant assigning resources to user equipment (UE) for UL transmissions to the gNB, wherein the assigned resources are insufficient for the UE to transmit UL data and a power headroom report (PHR) for a cell associated with the UL grant, receive, from the UE, the UL data and an indication of the PHR, and take one or more actions based, at least in part, on the received indication. The apparatus also generally includes a memory coupled with the at least one processor.

Certain aspects provide a method for wireless communication by a base station. The apparatus generally includes means for transmitting an uplink (UL) grant assigning resources to user equipment (UE) for UL transmissions to the gNB, wherein the assigned resources are insufficient for the UE to transmit UL data and a power headroom report (PHR) for a cell associated with the UL grant, means for receiving, from the UE, the UL data and an indication of the PHR, and means for taking one or more actions based, at least in part, on the received indication.

Certain aspects provide a method for wireless communication by a base station. The non-transitory computer-readable medium generally includes instructions that, when executed by at least one processor, cause the at least one processor to transmit an uplink (UL) grant assigning resources to user equipment (UE) for UL transmissions to the gNB, wherein the assigned resources are insufficient for the UE to transmit UL data and a power headroom report (PHR) for a cell associated with the UL grant, receive, from the UE, the UL data and an indication of the PHR, and take one or more actions based, at least in part, on the received indication.

Certain aspects provide a method for wireless communication by a UE. The method generally includes receiving an uplink (UL) grant assigning resources for UL transmissions by to a next generation Node B (gNB), determining the assigned resources are insufficient to transmit the UL transmissions; and based, at least in part, on the determination, transmitting, to the gNB, a power headroom report (PHR) having a negative value.

Certain aspects provide an apparatus for wireless communication by a UE. The apparatus generally includes at least one processor configured to receive an uplink (UL) grant assigning resources for UL transmissions by to a next generation Node B (gNB), determine the assigned resources are insufficient to transmit the UL transmissions; and based, at least in part, on the determination, transmit, to the gNB, a power headroom report (PHR) having a negative value. The apparatus also generally includes a memory coupled with the at least one processor.

Certain aspects provide an apparatus for wireless communication by a UE. The apparatus generally includes means for receiving an uplink (UL) grant assigning resources for UL transmissions by to a next generation Node B (gNB), means for determining the assigned resources are insufficient to transmit the UL transmissions; and based, at least in part, on the determination, means for transmitting, to the gNB, a power headroom report (PHR) having a negative value.

Certain aspects provide a non-transitory computer-readable medium for wireless communication by a UE. The non-transitory computer-readable medium generally includes instructions that, when executed by at least one processor, cause the at least one processor to receive an uplink (UL) grant assigning resources for UL transmissions by to a next generation Node B (gNB), determine the assigned resources are insufficient to transmit the UL transmissions; and based, at least in part, on the determination, transmit, to the gNB, a power headroom report (PHR) having a negative value.

Certain aspects provide a method for wireless communication by a base station. The method generally includes transmitting, to a user equipment (UE), a first uplink (UL) grant assigning resources for UL transmissions, based, at least in part on the UL grant, receiving from the UE a power headroom report (PHR) having a negative value, and based on the negative value, transmitting, to the UE, a second UL grant assigning additional resources for the UL transmissions.

Certain aspects provide a method for wireless communication by a base station. The apparatus generally includes at least one processor configured to transmit, to a user equipment (UE), a first uplink (UL) grant assigning resources for UL transmissions, based, at least in part on the UL grant, receive from the UE a power headroom report (PHR) having a negative value, and based on the negative value, transmit, to the UE, a second UL grant assigning additional resources for the UL transmissions. The apparatus also generally includes a memory coupled with the at least one processor.

Certain aspects provide a method for wireless communication by a base station. The apparatus generally includes means for transmitting, to a user equipment (UE), a first uplink (UL) grant assigning resources for UL transmissions, based, at least in part on the UL grant, means for receiving from the UE a power headroom report (PHR) having a negative value, and based on the negative value, means for transmitting, to the UE, a second UL grant assigning additional resources for the UL transmissions.

Certain aspects provide a method for wireless communication by a base station. The non-transitory computer-readable medium generally includes instructions that, when executed by at least one processor, cause the at least one processor to transmit, to a user equipment (UE), a first uplink (UL) grant assigning resources for UL transmissions, based, at least in part on the UL grant, receive from the UE a power headroom report (PHR) having a negative value, and based on the negative value, transmit, to the UE, a second UL grant assigning additional resources for the UL transmissions.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
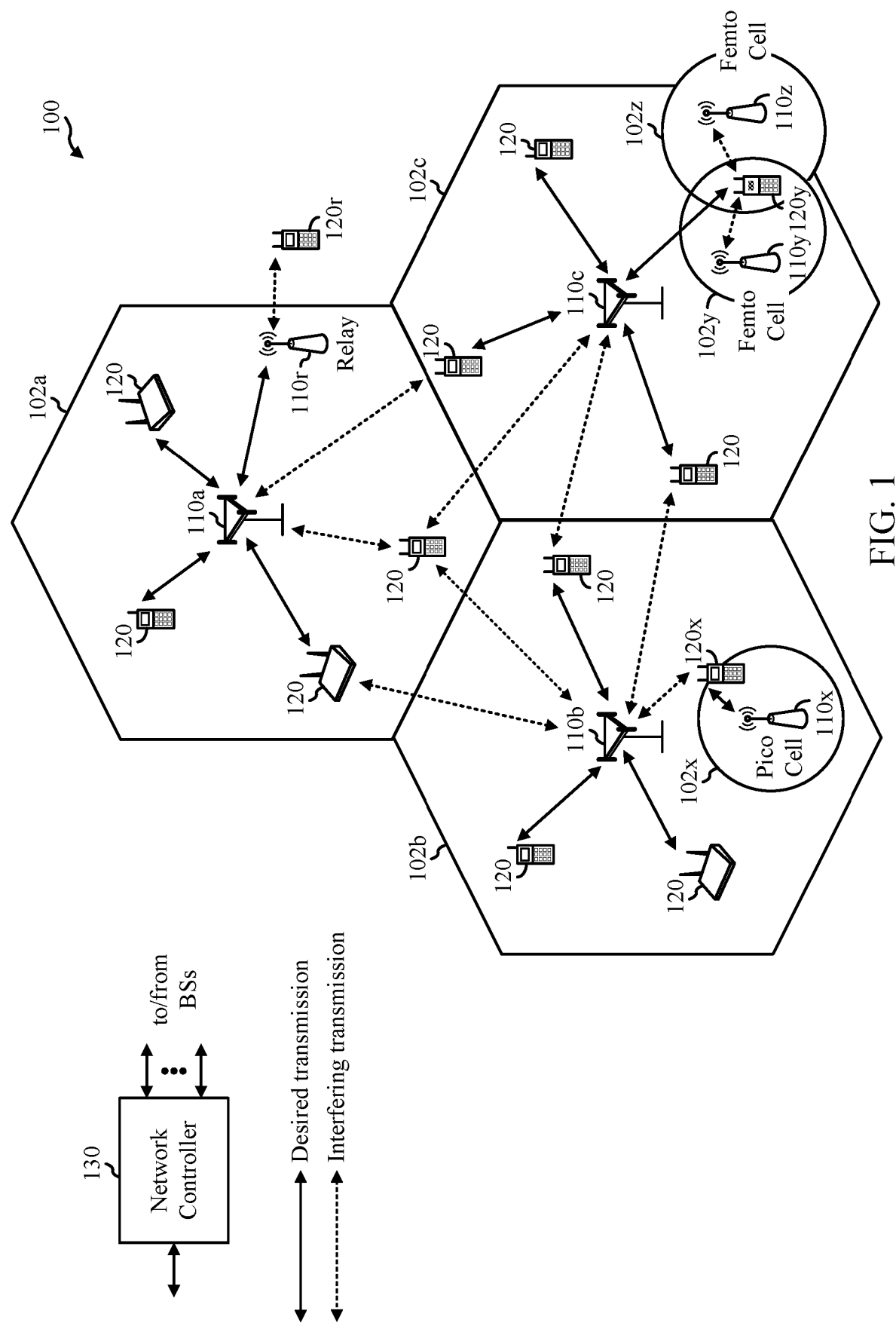
FIG. 1 is a block diagram conceptually illustrating an example telecommunications system, in accordance with certain aspects of the present disclosure.

Aspects of the present disclosure provide apparatus, methods, processing systems, and computer readable mediums for power headroom reporting (PHR). In certain scenarios, such as when a UE is at the coverage edge of a cell, UL resources assigned to the UE (e.g., via an UL grant) may be insufficient to transmit both UL transmissions as well as PHR. Thus, aspects presented herein provide techniques for allowing a UE to provide an indication of a PHR when the resources assigned to the UE do not permit (e.g., are insufficient) to transmit both the PHR and UL transmissions.

Additionally, in certain scenarios, resources assigned to a UE via an UL grant may be too small to transmit UL data. As an example, a gNB may preschedule resources for UL voice transmission. If a voice codec rate increases, the UE may need additional resources for UL voice transmissions. Thus, aspects of the present disclosure provide a negative PHR indicate the UE needs additional UL resources. In this manner, a UE may transmit a negative PHR to indicate a pre-scheduled or semi-persistent scheduled (SPS) UL resource is insufficient for the UE's UL transmissions. As a result, a gNB that receives the negative PHR may assign additional UL resources to the UE in response to the negative PHR.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. A UE 120 may be configured to transmit a PHR. In some cases, such as when the UE 120 is at a coverage edge (e.g., between or close to two or more cell coverage areas), UL resources assigned to the UE 120 may be insufficient for both UL transmissions and for transmission of a PHR. In certain scenarios, the UE 120 may transmit a negative PHR to indicate additional UL resources are needed by the UE 120.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and "next generation NodeB" (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
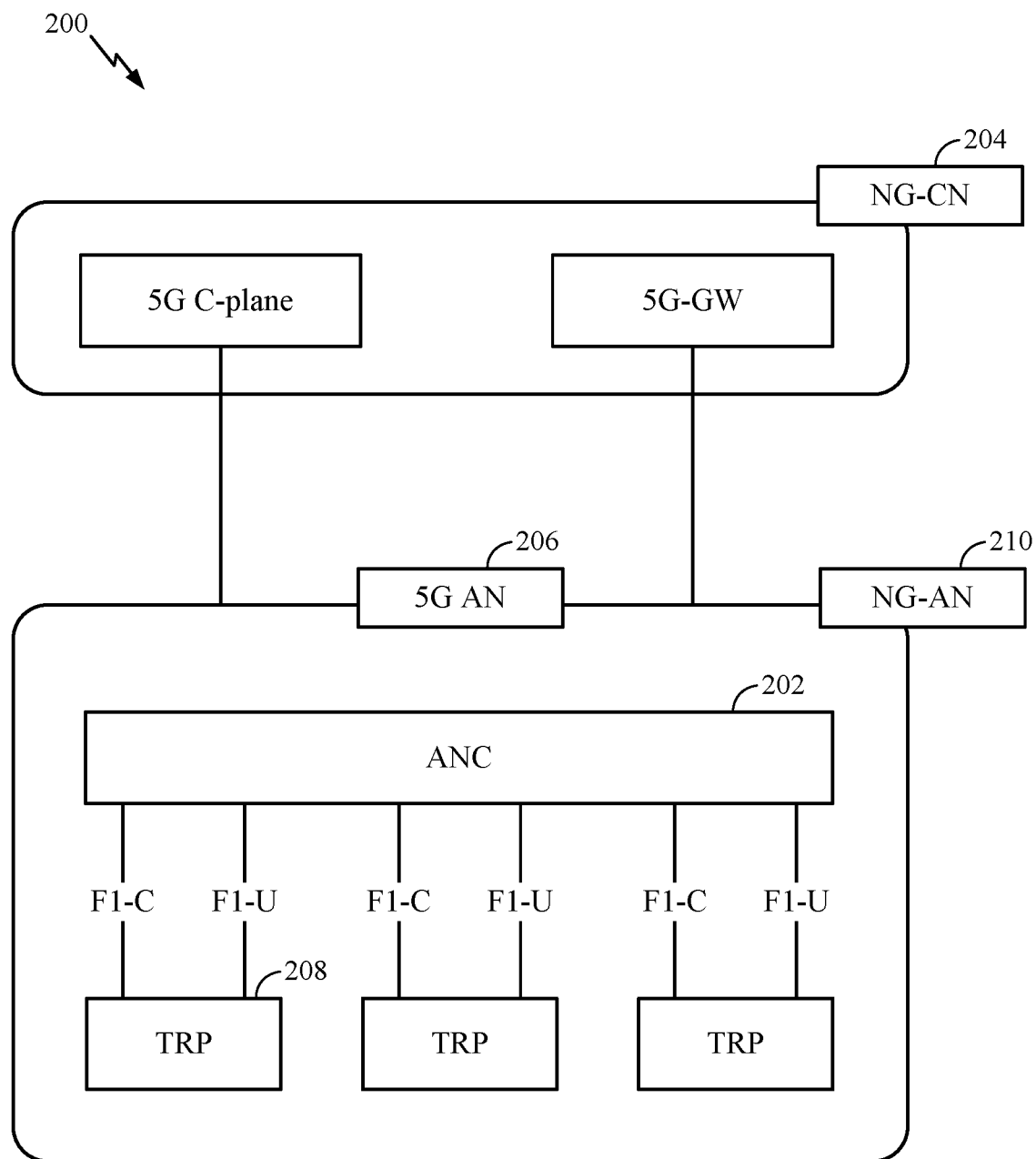
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
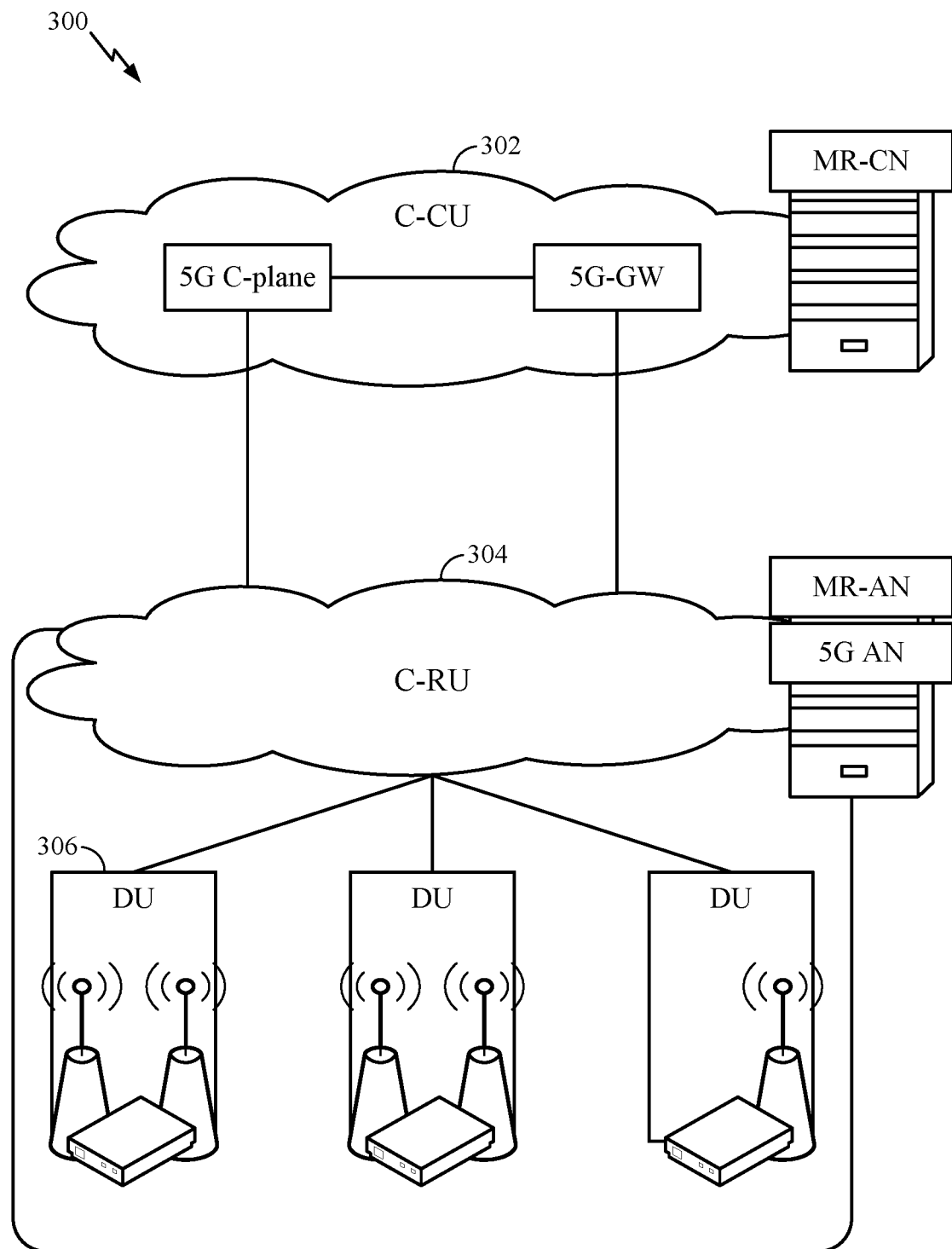
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
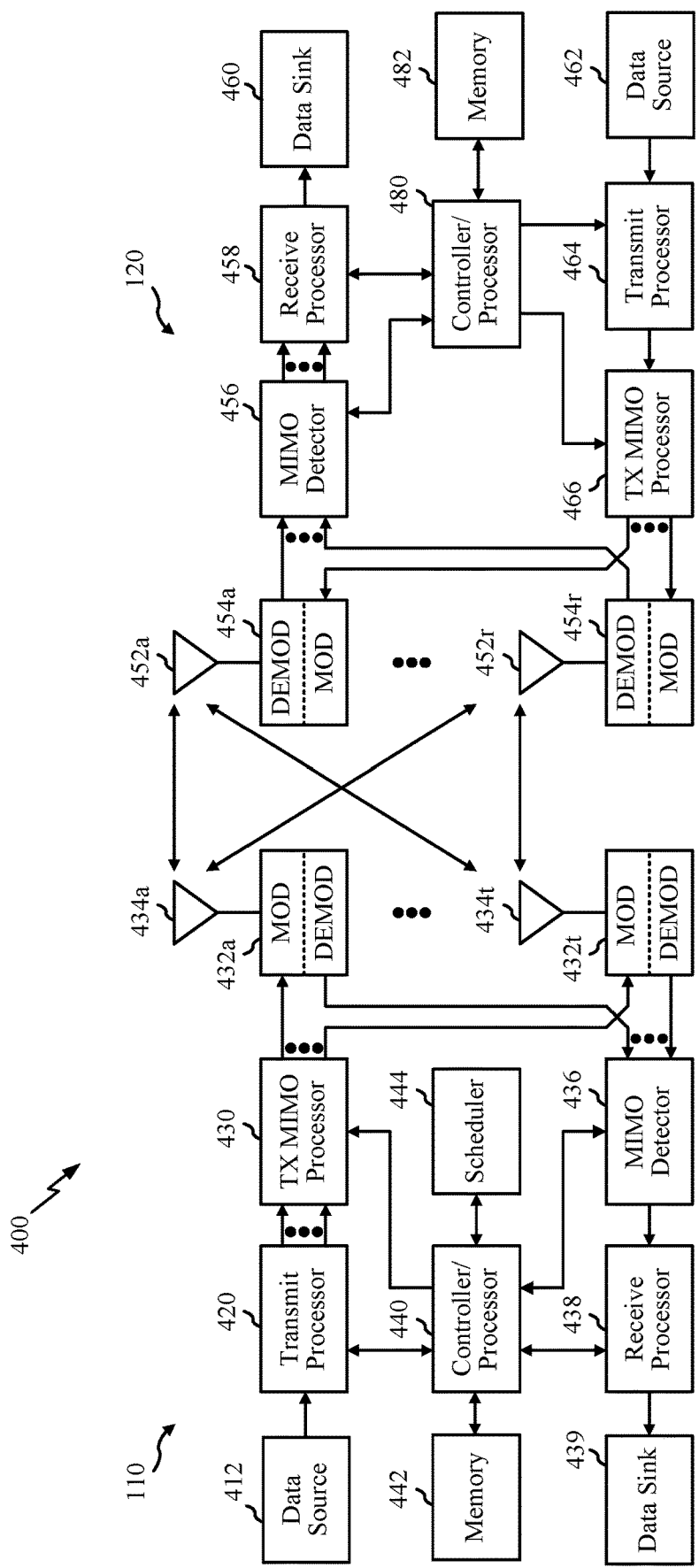
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein and as illustrated in FIGS. 11-14.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators in transceivers 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The controller/processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
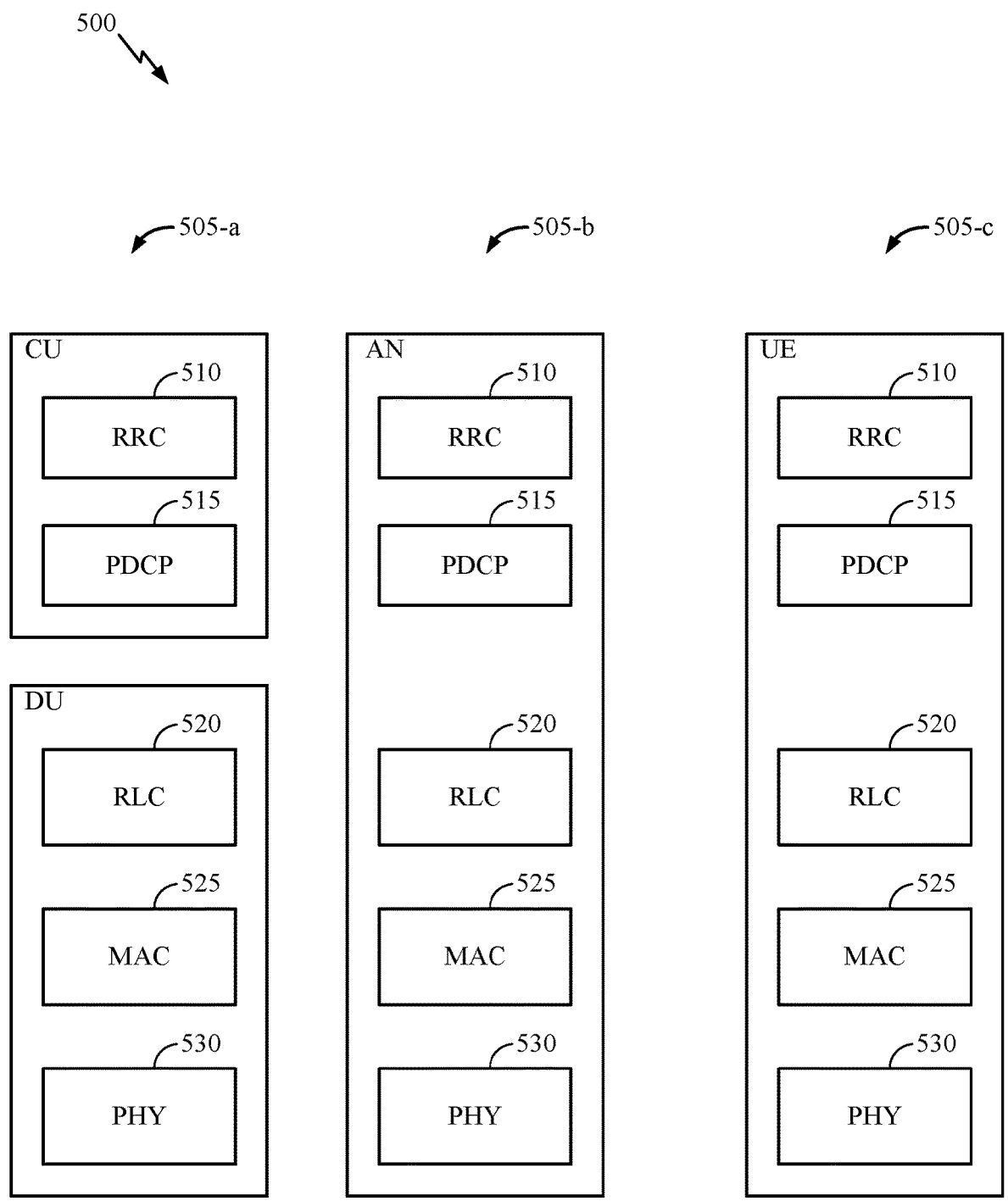
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
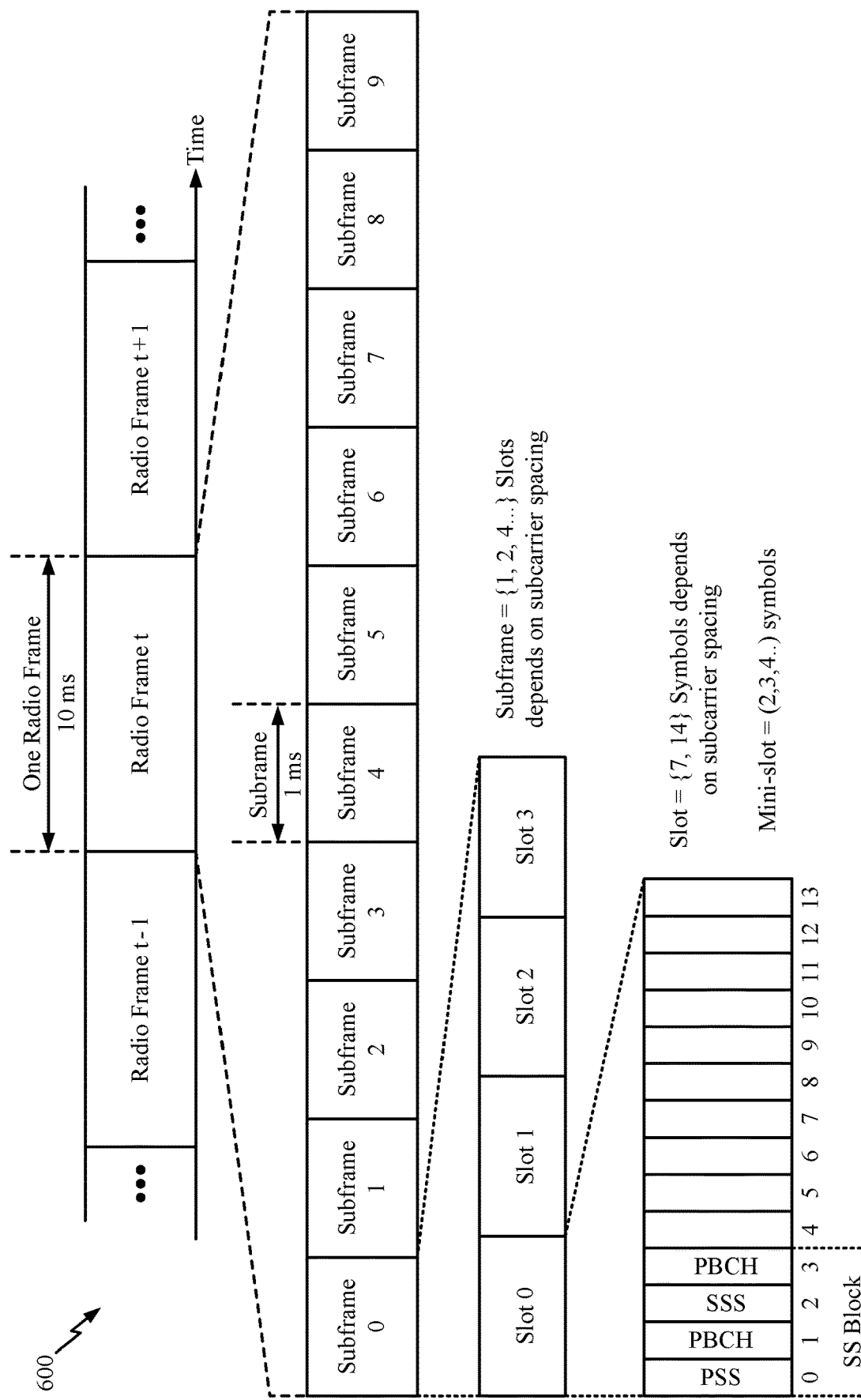
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example PHR

The power headroom reporting (PHR) procedure generally allows a UE to provide a serving gNB with information about the difference between a maximum transmit power and an estimated transmit power needed for a scheduled UL transmission. Stated otherwise, a PHR media access control (MAC) control element (CE) informs the network if the UE can transmit at a higher transmission power or not. The PHR indicates how much relative transmission power remains at the UE until a maximum transmit power is reached. The PHR may indicate a difference between a nominal UE maximum transmit power and the estimated power for an uplink shared channel (UL-SCH) transmission or SRS transmission.

A UE may be configured to perform PHR based on a number of different triggering events. For example, a UE may be triggered to report PHR upon expiration of a periodic timer. In other cases, the UE may be triggered to report PHR if a prohibit timer has expired (meaning PHR is not prohibited) and certain conditions occur (e.g., conditions that warrant an updated report).

Voice over Long Term Evolution (VoLTE) enables a UE to make cellular voice calls over an LTE network and allows the UE to not be dependent on maintaining a connection with the legacy circuit-switched voice network. VoLTE and, as described above, URLLC include latency and reliability requirements. Due to these requirements, it may be especially important that a UE transmit UL transmissions with little delay in an effort to meet stringent latency requirements. Further, it is important that the UL transmissions be reliably received to meet high reliability requirements.

In certain wireless communication systems, such as LTE, the PHR is typically 2 bytes, where one byte of data is eight bits. In 5G NR, the PHR is larger than LTE and includes at least 3 bytes of data. 5G NR defines two kinds of PHR that may be may be reported periodically or aperiodically: a Single Entry PHR MAC CE 700 (Section 6.1.3.8, TS38.321) as illustrated in FIG. 7 and a Multiple Entry PHR MAC CE 800 (Section 6.1.3.9, TS38.321) as illustrated in FIG. 8.

Figure 7:
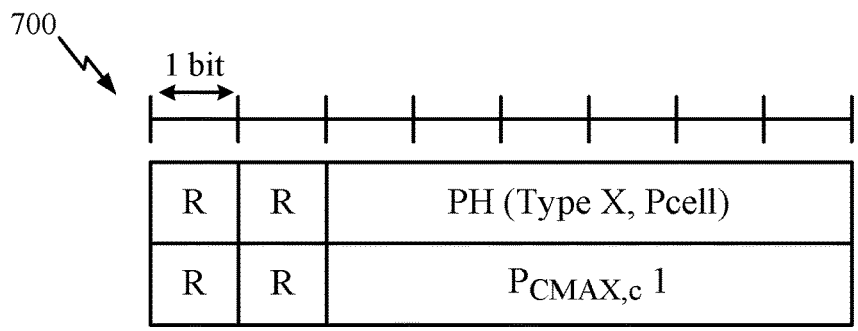
FIG. 7 illustrates a single entry PHR MAC CE.
Figure 8:
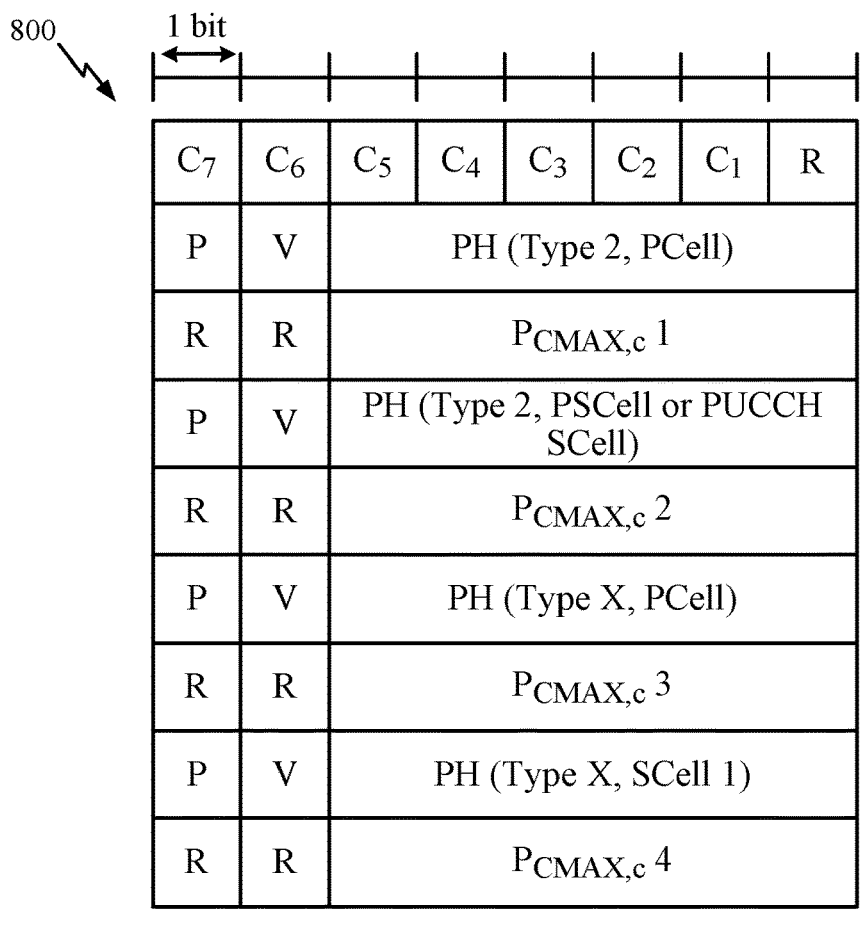
FIG. 8 illustrates a multiple entry PHR MAC CE.

A Single Entry PHR MAC CE may include 2 bytes of data in the payload (e.g., as illustrated in FIG. 7) and 1 byte in a subheader of the Single Entry PHR MAC CE (not illustrated). The multiple Entry PHR MAC CE 800 is much longer than the Single Entry PHR MAC CE 700. For example, as illustrated in FIG. 8, the number of bits in the Multiple Entry PHR MAC CE 800 may depend on the number of PCells and SCells the UE needs to transmit PHR for, whereas the Single Entry PHR MAC CE 700 only includes a single entry.

In certain scenarios, such as when a UE is between coverage areas of two or more cells (e.g., on the edge of the coverage areas of the two or more cells), the resources assigned to the UE may not accommodate/permit the UE transmitting both a PHR and UL transmissions, including, for example, high priority transmissions. One way to resolve this issue may be to prioritize PHR over certain UL transmissions. However, this prioritizing may lead to service quality issues. As an example, prioritizing PHR over one of Voice over NR (VoNR) or URLLC may increase latency. Currently, the UE may not transmit its UL transmission, but instead the UE requests for additional UL resources. In response, the network may transmit a grant, in a next subframe or after several subframes, which may downgrade service quality and be undesirable, especially for time-sensitive services, such as voice and URLLC.

Therefore, in accordance with aspects of the present disclosure, if a UL grant assigns the UE with insufficient resources (e.g., not enough time-frequency resources) to transmit both PHR and UL transmissions (e.g., data), the UE may equipped with techniques as presented herein to transmit an indication of the PHR as well as the UL transmission, thereby avoiding an increased delay in service. In certain cases, the UE may perform these techniques when the UE is scheduled to transmit a PHR while also scheduled for UL transmissions corresponding to some critical service, such as VoNR, URLLC, etc.

According to a first option, when the PHR=0 (e.g., which means the UE does not have additional transmit power available), the UE may skip transmitting the PHR for the cell on which UL resources were grants (e.g., grant cell). In this case, the network may interpret the lack of a PHR transmission from the UE as the UE having no additional transmit power available (PHR=0). In an example, the network may determine when the UE was expected to transmit a PHR, for example, based on periodic PHR schedule. Thus, in response to not receiving a PHR at the scheduled subframe, the network may determine the UE's PHR=0. In another example, the network may request an aperiodic PHR in a scheduled subframe. In response to not receiving the PHR in the scheduled subframe, the network may determine that the PHR of the UE equals zero (PHR=0) for the grant cell.

Figure 9:
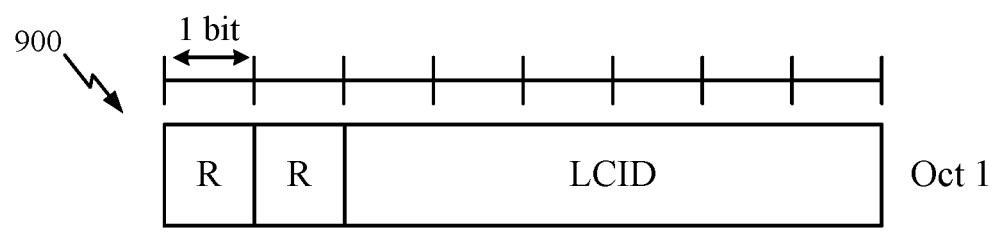
FIG. 9 illustrates an example of a new MAC CE without a payload, in accordance with certain aspects of the present disclosure.

According to a second option, as illustrated in FIG. 9, a new MAC CE sub-header 900 may be defined without a payload to indicate a PHR=0. The MAC CE sub-header 900 may be associated with a new logical channel ID (LCD) 902, which identifies a type of the payload. For example, a new LCID index, such as "111XXX" may be associated with a short PHR (e.g., to indicate that the MAC CE subheader 900 is transmitted without a payload). According to aspects, by defining a new MAC CE sub-header without a payload to indicate a PHR=0, the PHR may be reduced to 1 byte of sub-header, thereby saving 2 bytes. Thus, for example, in option two, a UE may transmit the (shorter) MAC CE sub-header 900 (which, as noted, excludes a payload) to indicate that PHR=0 at the UE. The gNB may receive and interpret the shorter MAC CE sub-header 900 (e.g., that includes a header but no payload) as meaning the PHR for the grant cell equals zero.

According to a third option, the UE may use a single entry PHR MAC CE for the cell carrying a critical service (e.g., VoNR, URLLC, etc., as described above). Therefore, when resources assigned in an UL grant are insufficient to carry a multiple entry PHR (e.g., such as the Multiple Entry PHR MAC CE 800), the UE transmit a single-entry PHR MAC CE that indicates a PHR for one cell, such as the grant cell.

According to a fourth option, a bit, which may be referred to as an "unhappy bit", may be used to indicate the UL grant is insufficient or not large enough to accommodate both a scheduled PHR and scheduled UL transmissions. In this manner, the single bit may indicate that the UE needs additional resources. In one example, a reserved bit 1002 (e.g., labeled "R") of the MAC CE sub-header 1000 in FIG. 10 may be the bit used to indicate the UL grant received by the UE is insufficient to support both PHR and UL transmissions. According to aspects, in some cases, the reserved bit 1002 is set to 1 may provide an indication that the PHR of the UE equals zero (e.g., PHR=0). The single "unhappy bit" may be transmitted in a sub-header of a MAC PDU and the data (such as voice or URLLC data) may be transmitted in a MAC service data unit (SDU).

According to aspects, upon receiving a value of 1 for the reserved bit 1002 (e.g., "unhappy" bit is set to 1), the gNB may determine that resources assigned an UL grant received by the UR are not sufficient to accommodate transmission of both PHR and UL transmission. In response, the gNB may transmit future UL grants with larger resource assignments (e.g., sufficiently large such that the UE may transmit its UL data). For example, since UL voice transmissions are periodic (e.g., once every 20 ms), the gNB may provide enough UL resources for the UE to transmit UL voice packets (in addition to transmitting the PHR).

Figure 11:
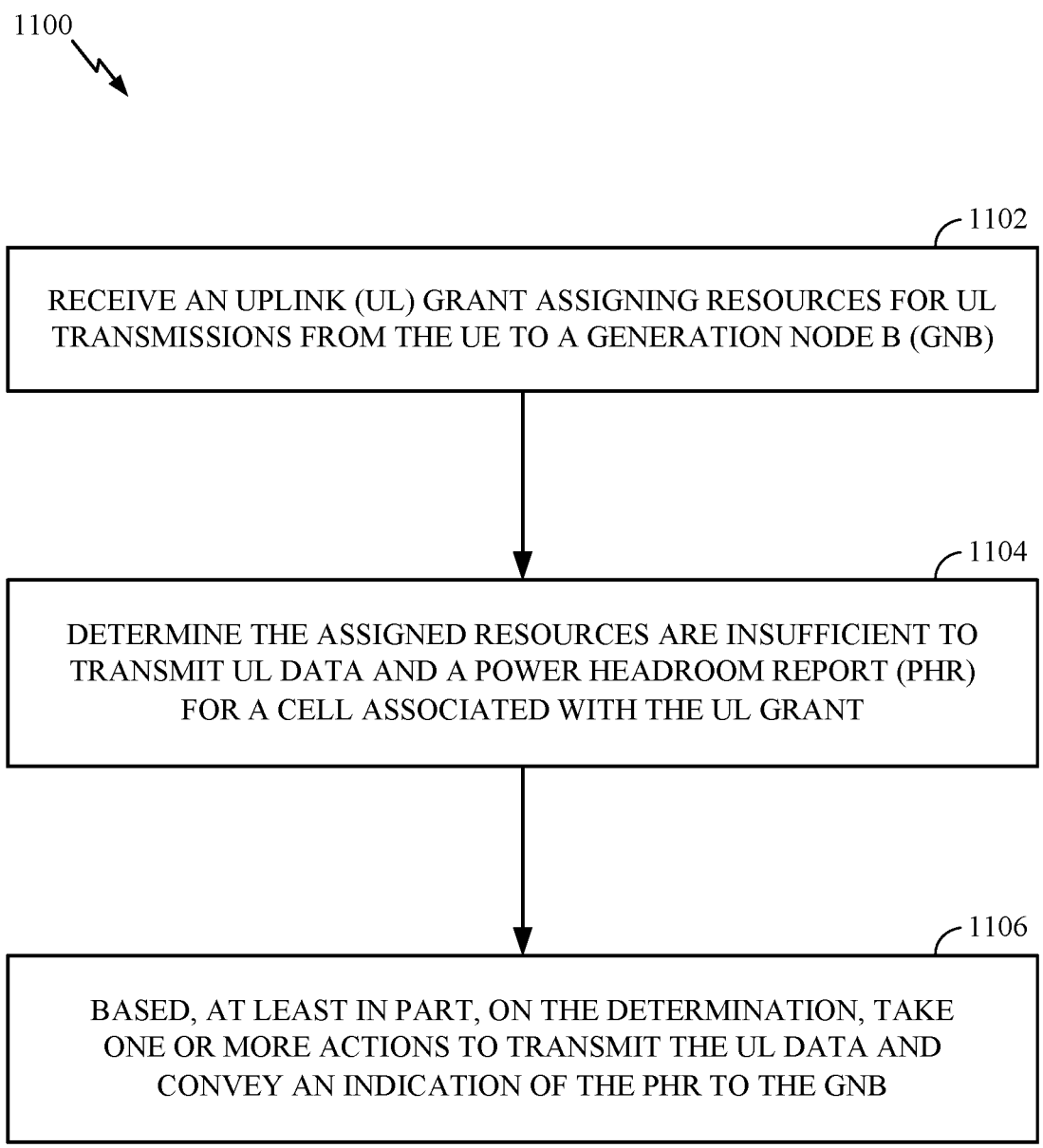
FIG. 11 illustrates example operations that may be performed by a UE, in accordance with certain aspects of the present disclosure.

FIG. 11 illustrates example operations 1100 that may be performed by a UE, including one or more components illustrated in FIGS. 4 and/or 16. In some cases, the UE may be on a coverage edge of one or more cells, resulting in resources assigned by an UL grant not being sufficient to transmit both UL data and a PHR.

At 1102, the UE may receive an uplink (UL) grant assigning resources for UL transmissions from the UE to a next generation Node B (gNB). At 1104, the UE determines the assigned resources are insufficient to transmit UL data and a power headroom report (PHR) for a cell associated with the UL grant. At 1106, based, at least in part, on the determination, the UE takes one or more actions to transmit the UL data and convey an indication of the PHR to the gNB.

Figure 12:
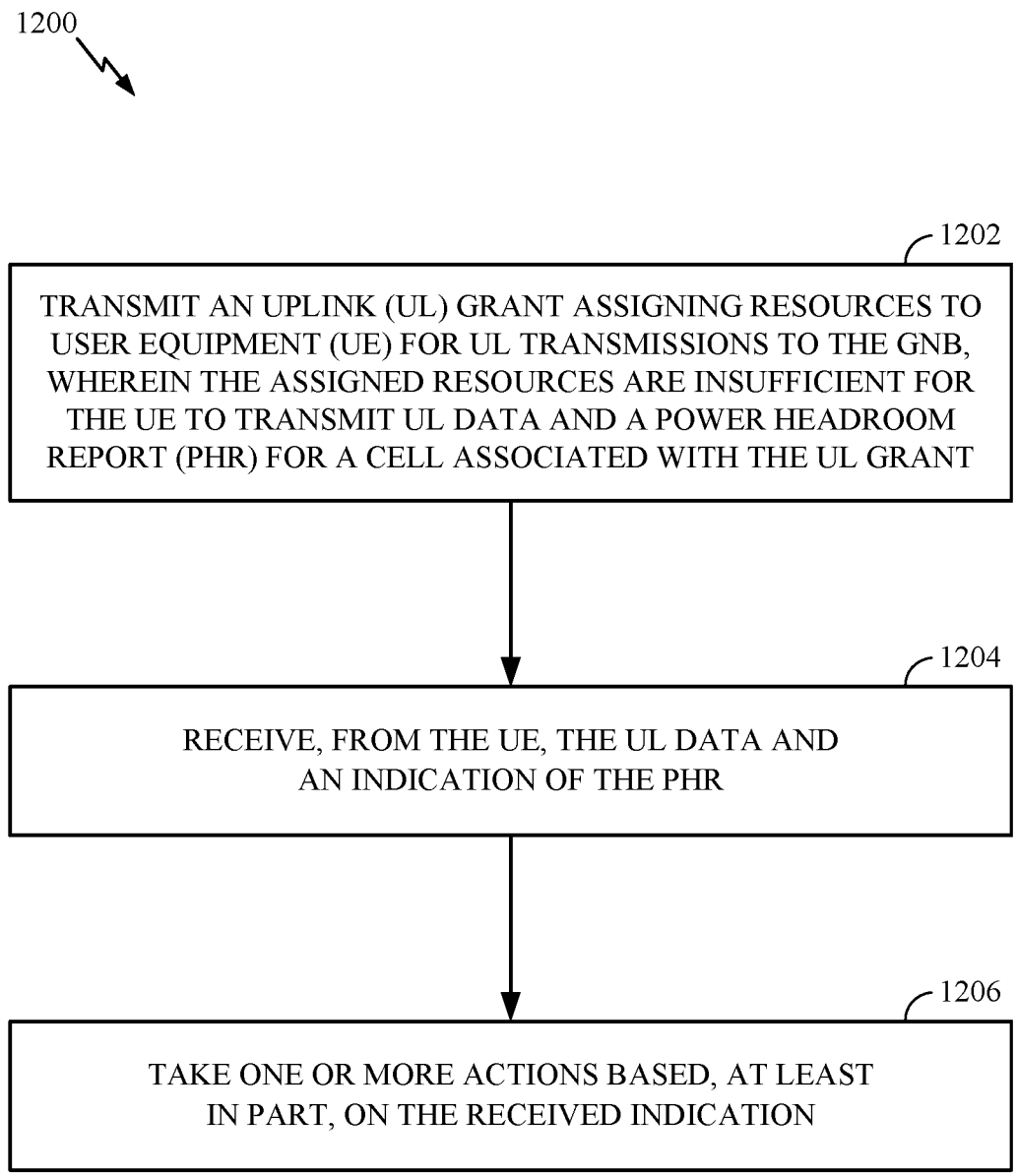
FIG. 12 illustrates example operations that may be performed by a gNB, in accordance with certain aspects of the present disclosure.

FIG. 12 illustrates example operations 1200 that may be performed by a gNB, including one or more components illustrated in FIGS. 4 and/or 17. According to aspects, operations 1200 performed by the gNB may be considered as complementary to operations 1100 performed by the UE.

At 1202, the gNB transmits an uplink (UL) grant assigning resources to user equipment (UE) for UL transmissions to the gNB, wherein the assigned resources are insufficient for the UE to transmit UL data and a power headroom report (PHR) for a cell associated with the UL grant. At 1204, the gNB receives, from the UE, the UL data and an indication of the PHR. In some cases, the indication of the PHR may indicate that the assigned resources are insufficient for the UE to transmit UL data and a PHR. At 1206, the gNB takes one or more actions based, at least in part, on the received indication.

According to aspects and as noted above, in some cases, taking one or more actions by the UE to convey the indication of the PHR may include refraining to transmit the PHR. For example, refraining from transmitting the PHR may indicate to the gNB that a PHR corresponds to zero for the cell. In other cases, taking one or more actions by the UE to convey the indication of the PHR includes transmitting the indication in a subheader portion of a MAC CE. In this case, the MAC CE may not include a payload. Additionally, in other cases, taking one or more actions by the UE to convey the indication of the PHR may include transmitting the PHR for the cell using a single entry PHR format.

Figure 13:
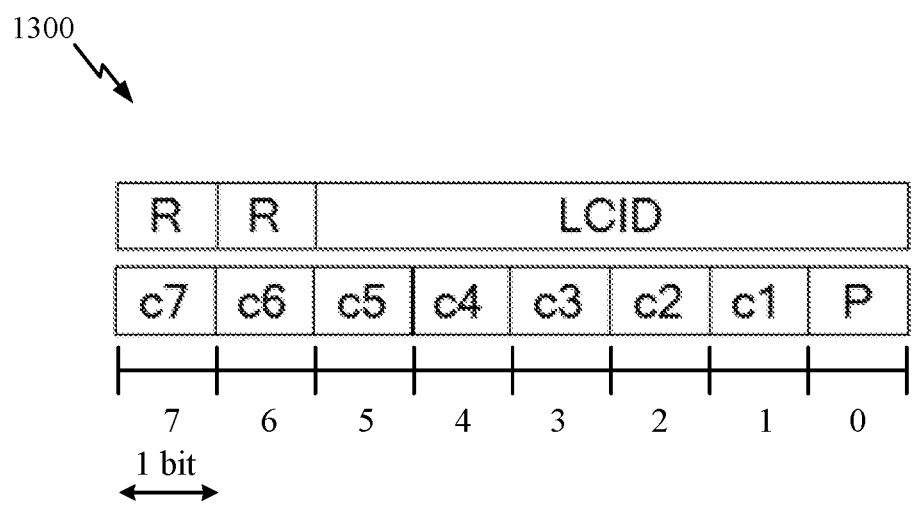
FIG. 13 illustrates an example multi-entry PHR MAC CE, in accordance with certain aspects of the present disclosure.

In another case, taking one or more actions to convey the indication of the PHR may include conveying the indication of the cell using a multiple entry (multi-entry) PHR MAC CE 1300 format, for example as illustrated in FIG. 13. The multi-entry PHR may be transmitted independently of aperiodic or periodic PHR reporting. According to this option, by using a multi-entry PHR MAC CE 1300, the UE may convey an one or more indications of insufficient resources (e.g., assigned via an UL grant) for more than one cell and/or that a PHR=0 for one or more cells.

That is, for example, the multi-entry PHR MAC CE 1300 coveys an indication of the PHR for not only the grant cell (e.g., the Primary Cell), but also for one or more other cells (Secondary Cells). The multi-entry PHR MAC CE 1300 may be a new MAC CE that indicates, for each of multiple cells, one of a PHR corresponding to 0 or that the UE does not have enough UL resources to transmit a PHR for the respective cell (e.g., in addition to UL data corresponding to the respective cell).

In an example, the multi-entry PHR MAC CE 1300 may include a one-byte header and a one-byte payload for [(P-Pcell) and (Ci—Scell with ScellIndex i)].

According to an example, for the payload of the multi-entry PHR MAC CE 1300 each bit (in the 1 byte of payload) may be a "0," indicating a PHR for the respective cell is 0 or a "1" indicating the UE needs to report the PHR for the respective cell but additional UL resources are needed. The bit value of "1" may indicate that the UE may not have enough resources for the UL transmission and the PHR for a specific cell. Therefore, in one example, for the payload:

Bit 0: P ➔ (P=0, indicates Pcell PHR is 0), (P=1, indicates Pcell PHR needs to be reported but the UE does not have enough UL resources);

Bit 1: C1 ➔ (C1=0, indicates Scell with ScellIndex 1 PHR is 0), (C1=1, indicates Scell with ScellIndex 1 PHR needs to reported but the UE does not have enough UL resources).

Bits 2-7 of the 1 byte of payload may be similar to Bit 1 and may correspond to a Scell with ScellIndex 2-7, respectively.

Therefore, by transmitting the multi-entry PHR MAC CE 1300 as described above, the UE may convey an indication for PHR associated with each of multiple cells.

Additionally, in some cases, the UE may indicate that the assigned UL resources for transmitting the PHR for a specific cell are not sufficient before the UE runs out of resources (e.g., PHR equals zero). Accordingly the UE may gradually report, via the PHR MAC CE (e.g., multi-entry PHR MAC CE 1300), that it needs additional UL resources. That is, for example, the UE may not wait until the PHR=0 to provide an indication that more UL resources are needed to transmit data and the PHR. In response, the network may respond and assign the UE with additional UL resources, for example, before the UE is limited by an existing UL grant.

In another case, taking one or more actions by the UE to convey the indication of the PHR comprises transmitting an explicit indication that the UL grant is insufficient to transmit the UL data and the PHR. In response to the indication, the gNB may take action to transmit an additional UL grant to the UE, assigning additional resources for the UL transmissions to the gNB. Thus, the UE may transmit the PHR using resources provided via the additional UL grant.

Figure 10:
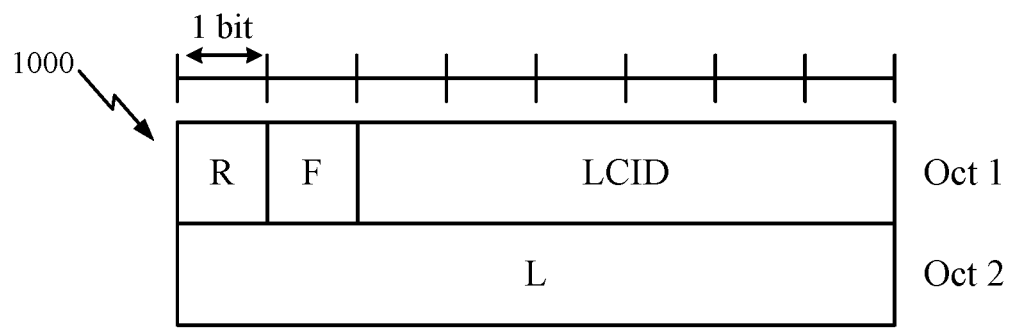
FIG. 10 illustrates an example of an "unhappy bit" used to indicate the UE's assigned UL resources are insufficient, in accordance with certain aspects of the present disclosure.

In some cases, for example with reference to FIG. 10, the indication that the UL grant is insufficient may be transmitted using reserved bit (e.g., 1002) of a header of a MAC sub-packet data unit (PDU).

Generally, as described herein, the UE may convey an indication the UL grant is insufficient to transmit the UL data and the PHR for the cell. In response to the indication, the UE may receive from the gNB, an additional UL grant assigning additional resources for UL transmissions to the gNB. The UE may transmit the PHR and the UL data based, at least in part on the additional UL grant.

Generally, as described herein, the gNB may receive an indication the UL grant is insufficient for the UE to transmit the UL data and the PHR for the cell. In response, the gNB may transmit to the UE, an additional UL grant assigning additional resources for UL transmissions to the gNB. The eNB may receive the PHR and the UL data based, at least in part on the additional UL grant.

Negative PHR

Currently, PHR values are positive. However, according to aspects of the present disclosure, a negative PHR value may be used to indicate (1) a UE needs additional UL resources and, in some aspects, (2) indicate how much additional resources are needed by the UE.

In some cases, UL scheduling of a UE in VoLTE may not be based on a buffer status report (BSR), as the UE does not typically transmit a BSR for a voice channel. Instead, the eNB pre-schedules the UL transmission for the UE based on a voice packet cycle and data radio bearer (DRB) parameters associated with the UE.

An issue arises, however, when multiple services are multiplexed on a same DRB since the gNB may not know the data rate of voice services. Therefore, when a voice codec rate increases, the UL resources assigned to the UE via an UL grant may be too small to carry voice and other info (e.g. MAC CEs). For example, a voice data rate may be 12.2 kps and the UE may increase the rate to 24.2 kps. Consequently, the UE may need more UL resources to support the increased rate. However, the network may be unaware of this change. Thus, in accordance with aspects of the present disclosure, the UE may transmit a negative PHR, indicating to the gNB that the UL resources assigned in the UL grant are insufficient. The negative value may be used by NW/gNB to calculate how much additional UL resources are needed by the UE and assign the UE additional UL resources as needed, for example, by transmitting an additional UL grant with additional UL resources for the UE to use to transmit the voice data and other info (e.g., MAC CEs).

Figure 14:
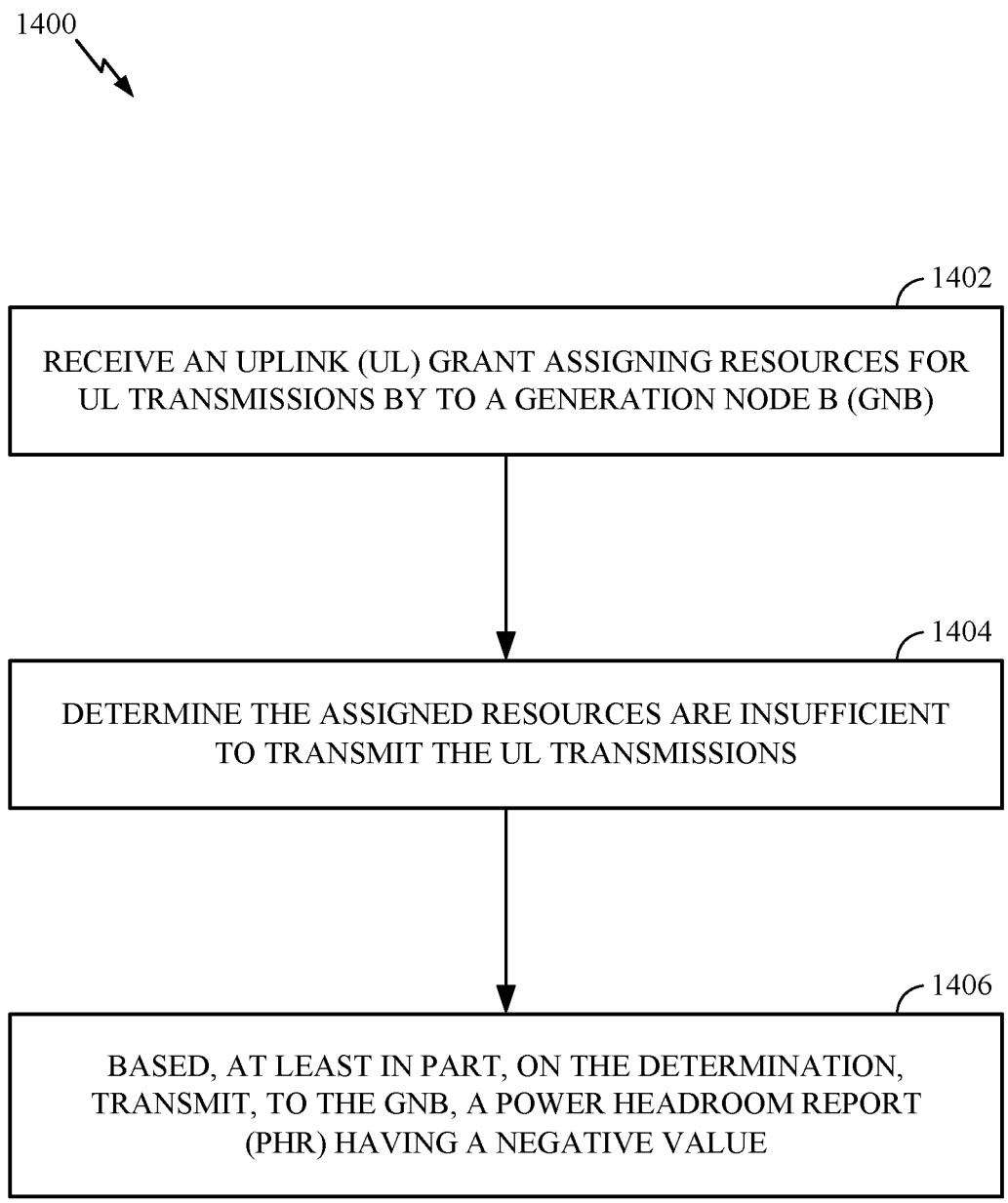
FIG. 14 illustrates example operations that may be performed by a UE, in accordance with certain aspects of the present disclosure.
Figure 16:
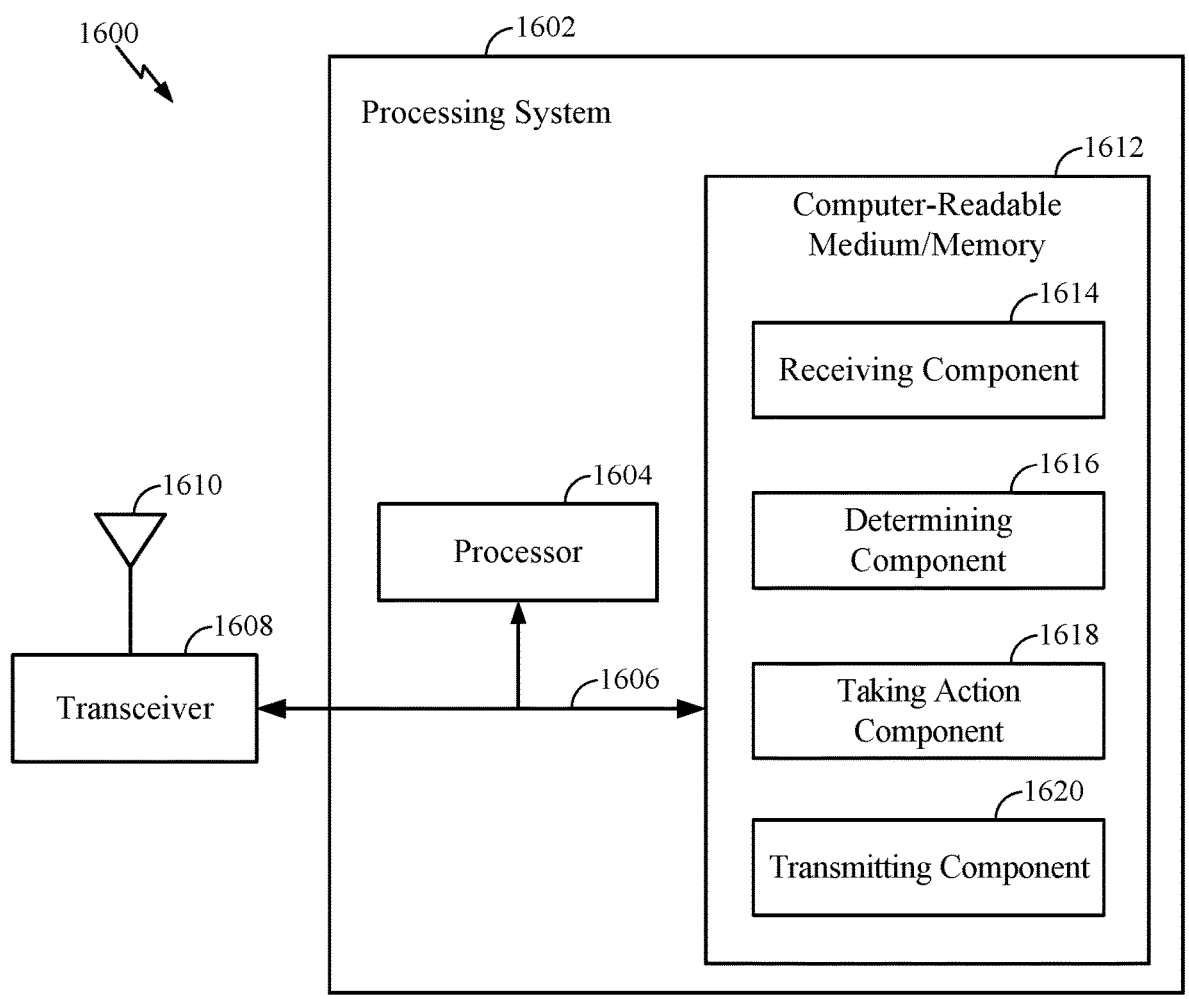
FIG. 16 illustrates an example communications device, such as a UE, that may include various components configured to perform operations for the techniques disclosed herein in accordance with aspects of the present disclosure.

FIG. 14 illustrates example operations 1400 that may be performed by a UE, including one or more components illustrated in FIGS. 4 and 16.

At 1402, the UE receives and UL grant assigning resources for UL transmissions by to a generation Node B (gNB). At 1404, the UE determines the assigned resources are insufficient to transmit the UL transmissions. At 1406, based, at least in part, on the determination, the UE transmits, to the gNB, a power headroom report (PHR) having a negative value.

Figure 15:
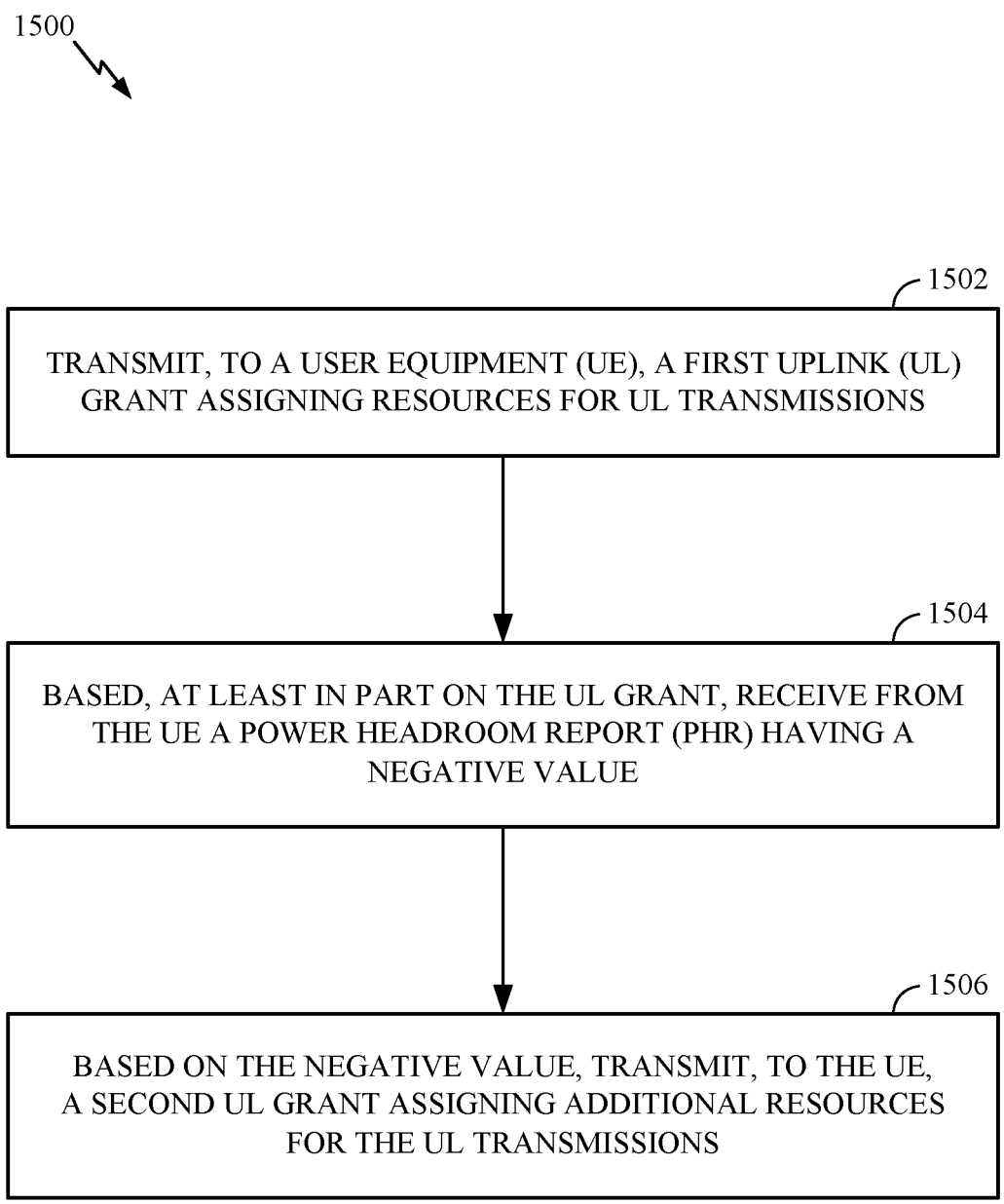
FIG. 15 illustrates example operations that may be performed by a gNB, in accordance with certain aspects of the present disclosure.
Figure 17:
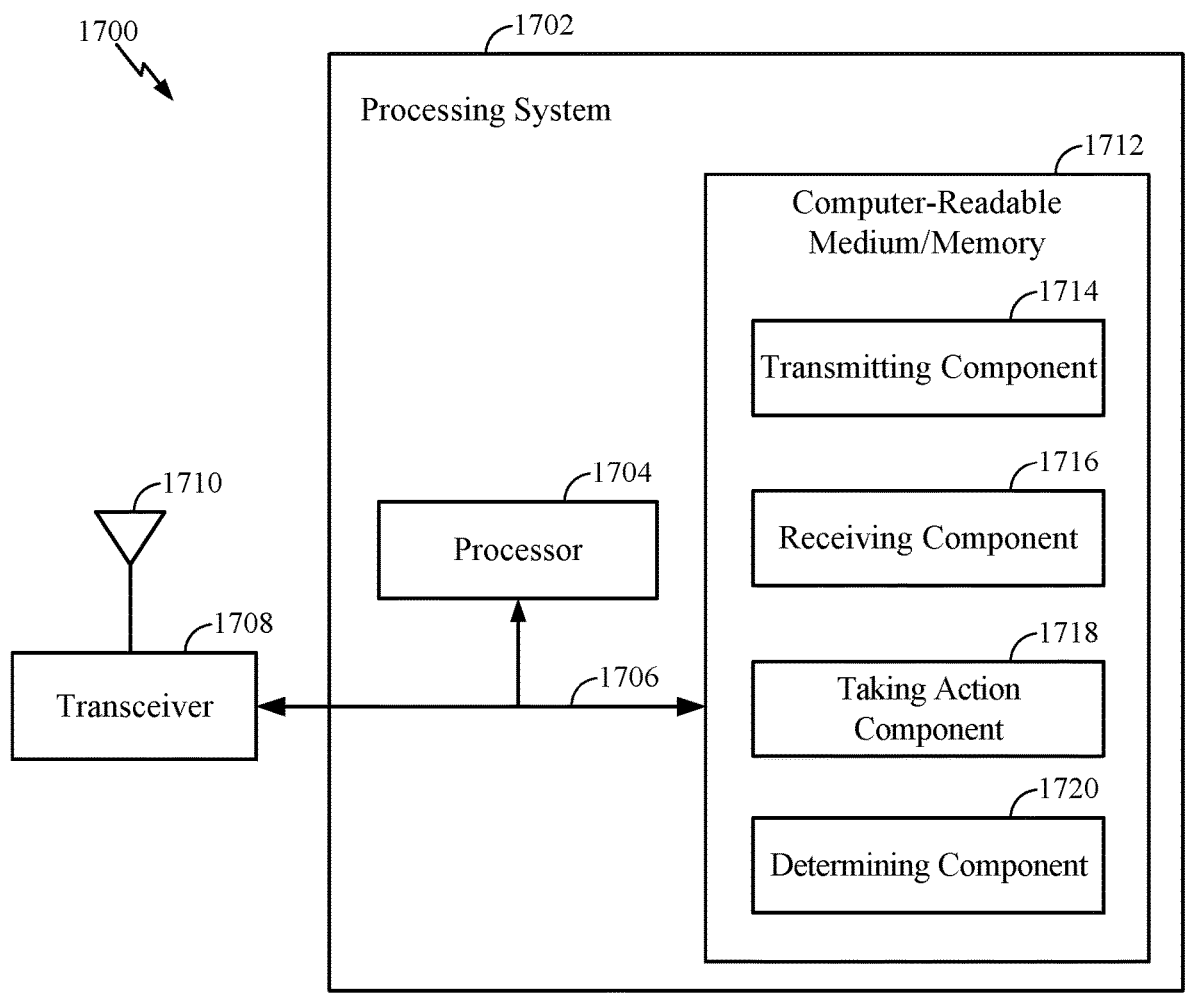
FIG. 17 illustrates an example communications device, such as a gNB, that may include various components configured to perform operations for the techniques disclosed herein in accordance with aspects of the present disclosure.

FIG. 15 illustrates example operations 1500 that may be performed by a gNB, including one or more components illustrated in FIGS. 4 and 17. Operations 1500 performed by the gNB may be considered as complimentary to operations 1500 performed by the UE.

At 1502, the gNB transmits, to a user equipment (UE), a first uplink (UL) grant assigning resources for UL transmissions. At 1504, based, at least in part on the UL grant, the gNB receives from the UE a power headroom report (PHR) having a negative value. At 1506, based on the negative PHR value, the gNB transmits to the UE, a second UL grant assigning additional resources for the UL transmissions.

As described above, the negative value of the PHR may indicate that the resources assigned to the UE are insufficient to transmit the UL transmissions. The UL transmissions may include voice transmissions and a MAC CE. In some cases, the UL transmissions may include transmissions from multiple services that are multiplexed on a same DRB.

In some cases, the UE may determine the assigned resources are insufficient by determining codec rate for at least a portion of the UL transmissions has increased (e.g., by a threshold).

In response to receiving a negative PHR, the gNB may determine that the UL resources assigned to the UE are insufficient. The gNB may then assign the UE with an amount of additional UL resources and convey this assignment via an additional UL grant. In some cases, the gNB may determine the amount of additional UL resources based on a value of the negative PHR. For example, a higher absolute value of the PHR may indicate more UL resources are needed as compared to a lower absolute value of the PHR.

FIG. 16 illustrates a communications device 1600 that may include various components (e.g., corresponding to means-plus-function components) configured to perform operations for the techniques disclosed herein, such as the operations illustrated in FIGS. 11-12 and 14-15. The communications device 1600 includes a processing system 1602 coupled to a transceiver 1608. The transceiver 1608 is configured to transmit and receive signals for the communications device 1600 via an antenna 1610, such as the various signal described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions that when executed by processor 1604, cause the processor 1604 to perform the operations illustrated in FIGS. 11-12 and 14-15, or other operations for performing the various techniques discussed herein.

In certain aspects, the processing system 1602 further includes a receiving component 1614 a determining component 1616, a taking action component 1618, and a transmitting component 1620 for performing the operations described herein for transmitting an indication of PHR when an UL grant is insufficient. The components 1616-1620 may be hardware components. In certain aspects, the components 1616-1620 may be software components that are executed and run on processor 1604.

FIG. 17 illustrates a communications device 1700 that may include various components (e.g., corresponding to means-plus-function components) configured to perform operations for the techniques disclosed herein, such as the operations illustrated in FIGS. 11-12 and 14-15. The communications device 1700 includes a processing system 1702 coupled to a transceiver 1708. The transceiver 1708 is configured to transmit and receive signals for the communications device 1700 via an antenna 1710, such as the various signal described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions that when executed by processor 1704, cause the processor 1704 to perform the operations illustrated in FIGS. 11-12 and 14-15, or other operations for performing the various techniques discussed herein.

In certain aspects, the processing system 1702 further includes a transmitting component 1714, a receiving component 1716, a taking action component 1718, and a determining component 1720 for performing the operations described herein for transmitting an indication of PHR when an UL grant is insufficient. The components 1716-1720 may be hardware components. In certain aspects, the components 1716-1720 may be software components that are executed and run on processor 1704.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 11-12 and 14-15.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
receiving an uplink (UL) grant assigning resources for UL transmissions from the UE to a next generation Node B (gNB);
determining the assigned resources are insufficient to transmit UL data and a power headroom report (PHR) for a cell associated with the UL grant; and
based, at least in part, on the determination, taking one or more actions to transmit the UL data and convey an indication of the PHR to the gNB, wherein the indication indicates the assigned resources are insufficient for the UE to transmit both uplink data and the PHR.

2. The method of claim 1, wherein conveying the indication of the PHR comprises:
refraining to transmit the PHR, wherein the refraining indicates a PHR corresponding to zero for the cell.

3. The method of claim 1, wherein conveying the indication of the PHR comprises:
transmitting the indication in a subheader portion of a media access control (MAC) control element (CE), wherein the MAC CE does not include a payload.

4. The method of claim 1, wherein conveying the indication of the PHR comprises:
transmitting the PHR for the cell using a single entry PHR format.

5. The method of claim 1, wherein:
conveying the indication of the PHR comprises transmitting the PHR for the cell using a multi-entry PHR format, wherein the multi-entry PHR format conveys an indication of the PHR for the cell and a PHR associated with, at least, a secondary cell.

6. The method of claim 5, wherein the multi-entry PHR format comprises:
one bit associated with each of the cell and the secondary cell, wherein the one bit indicates one of a PHR of 0 associated with a respective cell or an insufficient UL grant associated with the respective cell.

7. The method of claim 1, wherein conveying the indication of the PHR comprises:
transmitting an indication that the UL grant is insufficient to transmit the UL data and the PHR;
in response to the indication, receiving an additional UL grant assigning additional resources for the UL transmissions to the gNB; and
transmitting the PHR based, at least in part, on the additional UL grant.

8. The method of claim 7, wherein the indication that the UL grant is insufficient is transmitted in a reserved bit of a header of a media access control (MAC) sub-packet data unit (PDU).

9. The method of claim 1, wherein taking the one or more actions comprises:
conveying an indication that the UL grant is insufficient to transmit the UL data and the PHR for the cell;
in response to the indication, receiving, from the gNB, an additional UL grant assigning additional resources for UL transmissions to the gNB, and
transmitting the PHR and the UL data based, at least in part on the additional UL grant.

10. The method of claim 1, wherein the UE is located at an edge of a coverage area provided by the gNB.

11. An apparatus for wireless communication by a user equipment (UE), comprising:
at least one processor configured to:
receive an uplink (UL) grant assigning resources for UL transmissions from the UE to a next generation Node B (gNB);
determine the assigned resources are insufficient to transmit UL data and a power headroom report (PHR) for a cell associated with the UL grant; and
based, at least in part, on the determination, take one or more actions to transmit the UL data and convey an indication of the PHR to the gNB, wherein the indication indicates the assigned resources are insufficient for the UE to transmit both uplink data and the PHR; and
a memory coupled with the at least one processor.

12. The apparatus of claim 11, wherein the at least one processor is configured to convey the indication of the PHR by refraining to transmit the PHR, wherein the refraining indicates a PHR corresponding to zero for the cell.

13. The apparatus of claim 11, wherein the at least one processor is configured to convey the indication of the PHR by transmitting the indication in a subheader portion of a media access control (MAC) control element (CE), wherein the MAC CE does not include a payload.

14. The apparatus of claim 11, wherein the at least one processor is configured to convey the indication of the PHR by transmitting the PHR for the cell using a single entry PHR format.

15. The apparatus of claim 11, wherein the at least one processor is configured to:
convey the indication of the PHR by transmitting the PHR for the cell using a multi-entry PHR format, wherein the multi-entry PHR format conveys an indication of the PHR for the cell and a PHR associated with, at least, a secondary cell.

16. The apparatus of claim 15, wherein the multi-entry PHR format comprises:
one bit associated with each of the cell and the secondary cell, wherein the one bit indicates one of a PHR of 0 associated with a respective cell or an insufficient UL grant associated with the respective cell.

17. The apparatus of claim 11, wherein the at least one processor is configured to convey the indication of the PHR by:
transmitting an indication that the UL grant is insufficient to transmit the UL data and the PHR;
in response to the indication, receiving an additional UL grant assigning additional resources for the UL transmissions to the gNB; and
transmitting the PHR based, at least in part, on the additional UL grant.

18. The apparatus of claim 17, wherein the indication that the UL grant is insufficient is transmitted in a reserved bit of a header of a media access control (MAC) sub-packet data unit (PDU).

19. The apparatus of claim 11, wherein the at least one processor is configured to take the one or more actions by:
- conveying an indication that the UL grant is insufficient to transmit the UL data and the PHR for the cell;
- in response to the indication, receiving, from the gNB, an additional UL grant assigning additional resources for UL transmissions to the gNB, and
- transmitting the PHR and the UL data based, at least in part on the additional UL grant.

20. The apparatus of claim 11, wherein the UE is located at an edge of a coverage area provided by the gNB.

21. An apparatus for wireless communication by a user equipment (UE), comprising:
- means for receiving an uplink (UL) grant assigning resources for UL transmissions from the UE to a next generation Node B (gNB);
- means for determining the assigned resources are insufficient to transmit UL data and a power headroom report (PHR) for a cell associated with the UL grant; and
- means for taking one or more actions to transmit the UL data and convey an indication of the PHR to the gNB based, at least in part, on the determination, wherein the indication indicates the assigned resources are insufficient for the UE to transmit both uplink data and the PHR.

22. The apparatus of claim 21, wherein the means for taking one or more actions to convey the indication of the PHR comprise:
- means for refraining to transmit the PHR, wherein the refraining indicates a PHR corresponding to zero for the cell;
- means for transmitting the indication in a subheader portion of a media access control (MAC) control element (CE), wherein the MAC CE does not include a payload; or
- means for transmitting the PHR for the cell using a single entry PHR format.

23. The apparatus of claim 21, wherein the means for taking one or more actions to convey the indication of the PHR comprise:
- means for transmitting the PHR for the cell using a multi-entry PHR format, wherein the multi-entry PHR format conveys an indication of the PHR for the cell and a PHR associated with, at least, a secondary cell, wherein the multi-entry PHR format comprises one bit associated with each of the cell and the secondary cell, wherein the one bit indicates one of a PHR of 0 associated with a respective cell or an insufficient UL grant associated with the respective cell.

24. The apparatus of claim 21, wherein the means for taking one or more actions to convey the indication of the PHR comprise:
- means for transmitting an indication that the UL grant is insufficient to transmit the UL data and the PHR, wherein the indication that the UL grant is insufficient is transmitted in a reserved bit of a header of a media access control (MAC) sub-packet data unit (PDU);
- means for receiving, in response to the indication, an additional UL grant assigning additional resources for the UL transmissions to the gNB; and
- means for transmitting the PHR based, at least in part, on the additional UL grant.

25. The apparatus of claim 21, wherein the means for taking one or more actions to transmit the UL data and convey an indication of the PHR comprise:
- means for conveying an indication that the UL grant is insufficient to transmit the UL data and the PHR for the cell;
- means for receiving, from the gNB, in response to the indication, an additional UL grant assigning additional resources for UL transmissions to the gNB, and
- means for transmitting the PHR and the UL data based, at least in part on the additional UL grant.

26. A non-transitory computer-readable medium for wireless communication by a user equipment (UE), comprising:
- instructions that, when executed by at least one processor, cause the at least one processor to:
  - receive an uplink (UL) grant assigning resources for UL transmissions from the UE to a next generation Node B (gNB);
  - determine the assigned resources are insufficient to transmit UL data and a power headroom report (PHR) for a cell associated with the UL grant; and
  - take one or more actions to transmit the UL data and convey an indication of the PHR to the gNB based, at least in part, on the determination, wherein the indication indicates the assigned resources are insufficient for the UE to transmit both uplink data and the PHR.

27. The non-transitory computer-readable medium of claim 26, wherein the instructions that cause the at least one processor to take the one or more actions to convey the indication of the PHR comprise instructions that cause the at least one processor to:
- refrain from transmitting the PHR, wherein the refraining indicates a PHR corresponding to zero for the cell;
- transmit the indication in a subheader portion of a media access control (MAC) control element (CE), wherein the MAC CE does not include a payload; or
- transmit the PHR for the cell using a single entry PHR format.

28. The non-transitory computer-readable medium of claim 26, wherein the instructions that cause the at least one processor to take the one or more actions to convey the indication of the PHR comprise instructions that cause the at least one processor to:
- transmit the PHR for the cell using a multi-entry PHR format, wherein the multi-entry PHR format conveys an indication of the PHR for the cell and a PHR associated with, at least, a secondary cell, wherein the multi-entry PHR format comprises one bit associated with each of the cell and the secondary cell, wherein the one bit indicates one of a PHR of 0 associated with a respective cell or an insufficient UL grant associated with the respective cell.

29. The non-transitory computer-readable medium of claim 26, wherein the instructions that cause the at least one processor to take the one or more actions to convey the indication of the PHR comprise instructions that cause the at least one processor to:
- transmit an indication that the UL grant is insufficient to transmit the UL data and the PHR, wherein the indication that the UL grant is insufficient is transmitted in a reserved bit of a header of a media access control (MAC) sub-packet data unit (PDU);
- receive, in response to the indication, an additional UL grant assigning additional resources for the UL transmissions to the gNB; and transmit the PHR based, at least in part, on the additional UL grant.

30. The non-transitory computer-readable medium of claim 26, wherein the instructions that cause the at least one processor to take the one or more actions to transmit the UL data and convey an indication of the PHR comprise instructions that cause the at least one processor to:
- convey an indication that the UL grant is insufficient to transmit the UL data and the PHR for the cell;
- receive, from the gNB, in response to the indication, an additional UL grant assigning additional resources for UL transmissions to the gNB, and
- transmit the PHR and the UL data based, at least in part on the additional UL grant.

\* \* \* \* \*